Sept. 28, 1965  R. R. GAMZON ETAL  3,209,084
ELECTRO-ACOUSTICAL TRANSDUCER
Filed Feb. 20, 1961  2 Sheets-Sheet 1

INVENTORS
ROBERT R. GAMZON
EPHRAIM H. FREI
BY
Darby & Darby
ATTORNEYS

Sept. 28, 1965    R. R. GAMZON ETAL    3,209,084
ELECTRO-ACOUSTICAL TRANSDUCER
Filed Feb. 20, 1961    2 Sheets-Sheet 2
FIG. 4
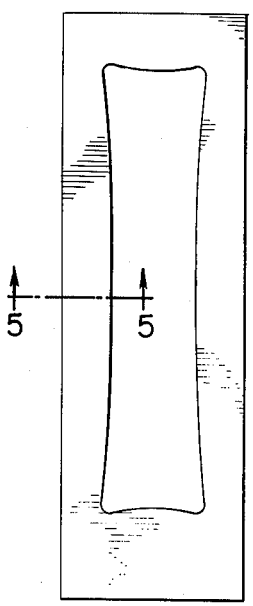
FIG. 5
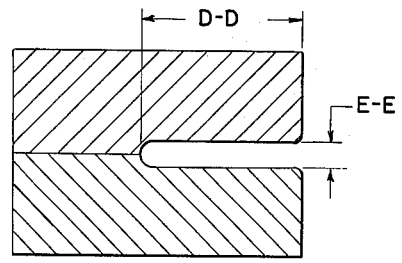
FIG. 6
FIG. 7
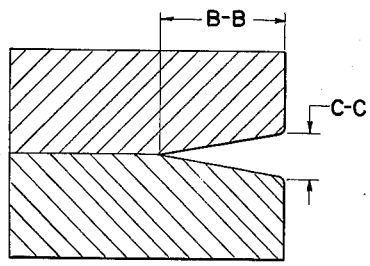
FIG. 8
FIG. 11
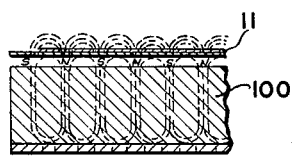
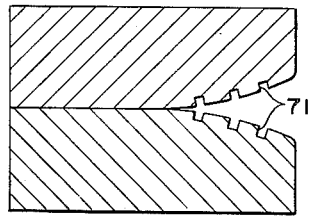
FIG. 9
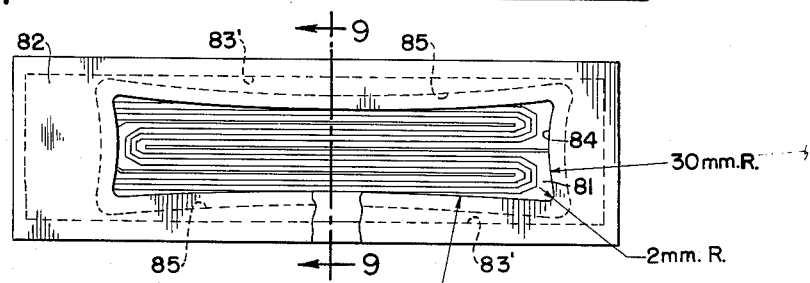
FIG. 10
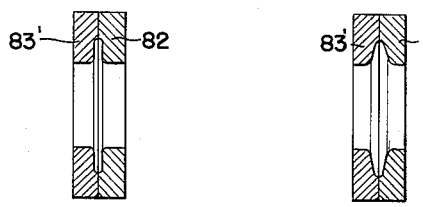
*INVENTORS*
ROBERT R. GAMZON
EPHRAIM H. FREI
BY
*Darby & Darby*
ATTORNEYS

United States Patent Office 3,209,084
Patented Sept. 28, 1965

3,209,084
ELECTRO-ACOUSTICAL TRANSDUCER
Robert R. Gamzon, Herzlia, Israel; Devorah Denise Gamzon and Miriam Gamzon, legal heirs of said Robert R. Gamzon, deceased, and Ephraim Heinrich Frei, Neve Weizmann Quarter, Rehovoth, Israel
Filed Feb. 20, 1961, Ser. No. 90,537
6 Claims. (Cl. 179—115.5)

The present invention relates to membranes or diaphragms of the type used with electro-acoustical transducers described in our copending patent application No. 775,252 filed November 20, 1958, now U.S. Patent No. 3,013,905 and to means for mounting same, so as to diminish distortions due to transverse waves.

Our copending application relates to an electro-acoustic transducer comprising an oscillatable membrane of non-magnetic material in combination with a magnetic unit comprising means defining a first pole closely spaced from said membrane on one side thereof and means defining a second pole of opposite polarity adjacent to and spaced from said first pole by a gap, said second pole being closely spaced from said membrane on said one side thereof, and conductor means disposed on and carried by said membrane, said conductor means being between said poles and extending along said gap.

In this prior application transducers were described which use an oscillatable membrane of non-magnetic material, carrying at least one flat, preferably ribbon-like, pliable conductor, connectable to an outer circuit and arranged in a pattern corresponding with the pattern of the magnet field zones so as to be located in the magnetic lines of force bridging alternate-polarity adjacent magnet poles. According to our copending application, the membrane may be as thin as about 10 microns, making for better acoustic reproduction, and the thickness of the conductor band is preferably very small compared to its width, the width being of the same order of magnitude as the distance between the center lines of adjacent magnet zones.

It is an object of the present invention to provide flat acoustic membranes for use in electro-acoustic transducers, adapted to be used in conjunction with conventional wireless or other circuits.

It is a further object of the invention to provide such membranes of improved acoustic characteristics.

It is an object to improve the performance of said electro-acoustic membranes by providing means for reducing the distortion due to transverse waves.

It is a further object of the present invention to provide such membranes characterized by increased sensitivity.

It is a further object of the present invention to provide electro-acoustic members of such impedance as to render possible the construction of efficient microphones of the type described in our said copending application.

Other objects and a fuller understanding of the invention may be had by referring to the following description and claims, taken in conjunction with the accompanying drawing in which:

FIGURE 4 is a plan view of a frame for the mounting of a membrane;

FIGURES 5, 6 and 7 are laterally enlarged sections of various frames according to FIGURE 4 taken along line A—A of FIGURE 4;

FIGURE 8 is a plan view of another membrane according to the invention, mounted in a frame so as to reduce distortions;

FIGURES 9 and 10 are cross-sectional views of two forms of frame according to FIGURE 8, taken along line I—I of FIGURE 8.

FIGURE 11 is a cross-section along the lines XI—XI of FIGURE 1, and illustrating a typical pole structure in accordance with our Patent No. 3,013,905.

Figure 3:
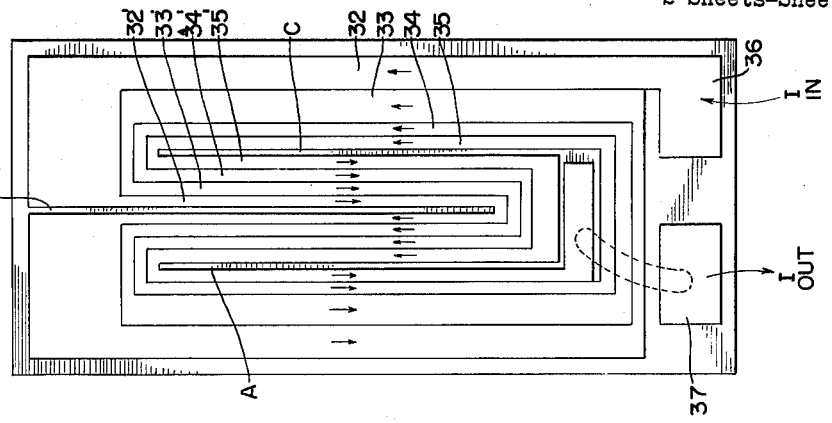
FIGURES 1 to 3 are plan views of three forms of membrane according to the invention.

It has been found that, although a membrane of the type described in our Patent No. 3,013,905 tends to move at every instant in the same direction all over its free surface, standing waves are sometimes set up on that surface, resulting in a certain degree of acoustic distortion. Such standing waves may change with a change of the frequency of the tone emitted and move all over the surface of the membrane.

We have discovered that the distortion is more marked with transducers which have a regular form such as rectangular or square, and which are of a comparatively small size (of the order of magnitude of say 2 to 4 inches), as in this case the ratio of circumference to area is relatively large.

In order to overcome this drawback, according to the present invention means are provided for dissipating as far as possible the transverse waves set up. It has been found that considerably less distortion is encountered with membranes according to the invention if they are stretched or mounted in frames of such shape as to minimize the regular reflection of transverse waves.

A frame according to the invention is shown, by way of example only, in FIG. 4. As seen from this figure, the frame boundaries facing the membrane are of a convex form, the convex sides being rounded off at their place of meeting with the adjacent sides, in order not to result in any sharp narrow zone. It was found that there exists an optimum radius of curvature, depending on the size of the transducer membrane. For example, a tweeter having a membrane of about 35 mm. by 110 mm. was built having convex boundaries facing the membrane, the radii of curvature being 450 mm. for the large sides and 30 mm. for the smaller sides, the corners being rounded off as shown in FIG. 4. Transverse waves are reflected from these convex boundaries in an irregular divergent pattern resulting in the dissipation of the energy of those transverse waves.

It has further been found that a further improvement in the performance of membranes according to the invention can be attained by resorting to damping of transverse waves. Such damping can be effectively had by providing means for dissipating the energy of waves arriving at the boundary of the membrane. According to the invention such damping may be effected by providing a narrow slit or groove at the boundary, the membrane passing substantially through the middle of that groove.

As shown in FIG. 6 such a groove may be given a converging cross-section, being preferably flared or curved at the edge. Satisfactory results were obtained with a depth of about 5 to 6 mm. (measured along line B—B) and of a width of about 0.1 mm. at the opening (along line C—C).

Although the shape shown in FIGURE 6 is advantageous, such cross-sections are not easily constructed. Quite satisfactory results can be obtained with more regular cross-sections which are easily and cheaply made. One such cross-section is shown in FIGURE 5, the depth along line D—D being about 5–7 mm., the width of the groove being about 0.08–0.12 mm. along line E—E. Channels 71 in the inner faces of the groove and extending generally parallel to the groove inner edge, as shown in FIG. 7, give a further improvement on damping. The combination of the convex boundaries with the provision of such grooves along said boundaries results in improved damping.

Although we do not wish to be bound by any specific theory, it is believed pointed out that the air in the narrow groove acts as an efficient damping means. Optimal damping will be attained when the transverse resistive impedance due to the air damping means is of the same order of magnitude as the characteristic transverse impedance of the membrane at the frequencies where damping is to be effected. We have found that satisfactory damping will be obtained when the depth of the groove used is about one quarter of the wave length of the transverse waves to be damped. It is clear that this last condition cannot be complied with in case of a speaker of a wide range of frequencies, but experience indicates that a depth of about 5 to 8 mm. gives reasonable results for tweeters of a size having a membrane of about 35 mm. by 110 mm.; a depth of about 20 mm. being desirable for woofers of about 300 mm. diameter, in which case a groove width of about 0.5 mm. at the opening of the groove will be desirable.

In order to be usable with receivers of conventional characteristics, transducers according to the invention must have a certain predetermined electrical impedance. In order to provide transducer tweeters of say 3 or 8 ohms impedance, of good sound-reproducing qualities, it was found desirable to resort to certain definite features of construction, as will be set out hereinafter.

The use of aluminum conductor ribbon of a thickness of about 5–10 microns was found to give optimal results and it was found that a special configuration of the aluminum ribbon on the pliable plastic membrane desirably may be resorted to in order to obtain the desired impedance. It was found that satisfactory results can be obtained by using a membrane of conductor-ribbon configuration as shown in FIGURES 1, 2, 3 and 8. A plastic membrane of the type described in our Patent No. 3,013,905 is used, having a thickness of about 5 to 30 microns. With tweeters having a membrane of about 30 by 100 mm. a membrane of about 5 to 12 microns thickness was found satisfactory.

Generally speaking, the arrangement of the conductor ribbon is such that a number of parallel stretches are arranged close to each other, being cut by lines of force between adjacent magnet poles of different pole sign at a zero or small angle, the direction of flow of electric current through adjacent ribbons of each group being in the same direction, the direction of current flow through adjacent groups of conductor ribbon being such as to result in a tendency to move the membrane in a direction perpendicular to its surface, in the same direction all over the surface.

It is to be understood that such an arrangement may be provided by resorting to different configurations of the flat conductor ribbon on the membrane, some embodiments being illustrated by way of example in the drawing.

Figure 2:
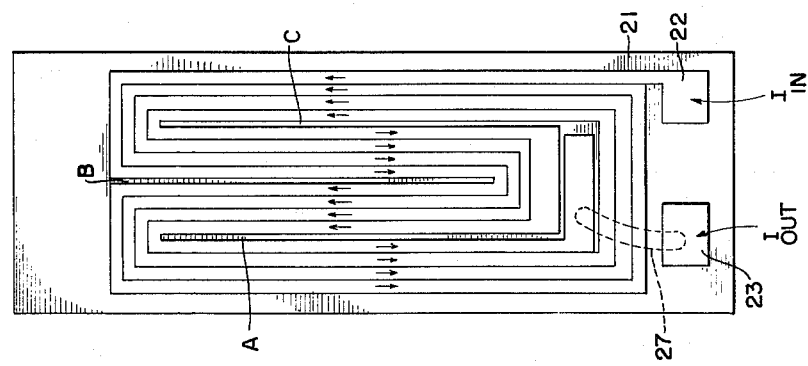
Figure 1:
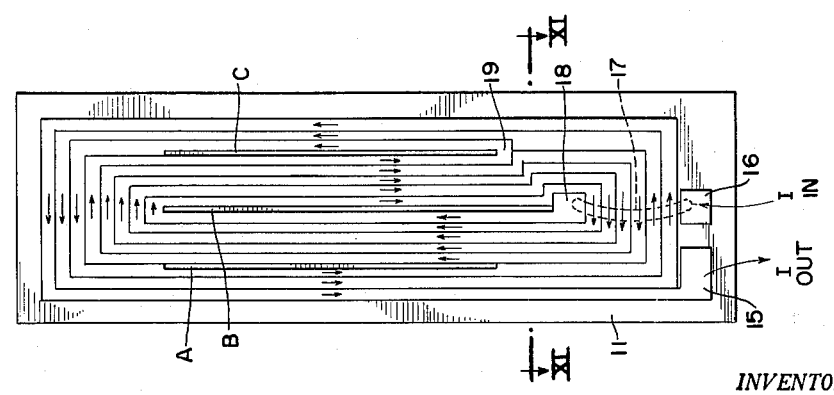

In FIGURES 1, 2, 3 and 8 several membranes of tweeters are shown, to be used with a magnet system of the type described in our Patent No. 3,013,905, comprising three magnet zones the center lines of which correspond with the direction of the three dark longitudinal lines A, B and C of the FIGURES 1, 2 and 3. FIG. 11, which corresponds to FIG. 3 of our previous patent, shows a typical arrangement of the magnet pole member 100, substantially parallel situated with respect to membrane 11, as shown in FIGURE 1.

As shown in these figures, the conductor ribbons run parallel to each other from end to end of the longitudinal magnet poles and return at the ends of these poles in short arcs or connections, the ribbons being arranged in such manner that the current flowing through each group of adjacent stretches flows in the same direction.

A tweeter membrane, as shown in FIGURE 1 comprises a thin plastic membrane 11, provided with a winding aluminum ribbon, having terminals 15 and 16 for connection with the corresponding input or output circuit.

By way of example, terminal 16 is shown as a current input terminal and terminal 15 as a current output terminal. The terminal 16 is connected by a strip 17 on the opposite side of membrane 11 to the inner end 18 of the conductor strip, which passes in multiple turns around the inner magnet location B and then, with a direction reversal at 19, in multiple turns about both the magnet locations A and C, to the other terminal 15. In that way, as shown by the arrows on the conductor strip, current in the group of conductor lengths between A and B proceed in one direction, while current in the group of the lengths between B and C is in the opposite direction. Since the magnetic field between A and B is of opposite directions to that between B and C, the resultant force on the membrane is in the same direction over its whole surface.

In order to obtain improved performance, the following arrangement is resorted to: as the magnetic field between the outside magnet locations and the boundary of the membrane is relatively weak, a smaller number of windings is positioned in this section of the membrane, as shown in FIGURE 1.

The membrane shown in FIGURE 2 comprises a thin plastic sheet 21, provided with a winding flat conductor ribbon having terminals 22 and 23.

In this case, the conductor strip instead of being generally spiral as in FIG. 1, is generally serpentine, with successive serpentine turns, each nested within the preceding one. The arrangement of current flow is as in FIG. 1.

In FIG. 3, an arrangement is shown generally like FIG. 2. However, for improved performance, the conductor strips between the outer magnet locations and the membrane boundary are made broader; thus, in FIG. 3 the stretches 32, 33 are made broader than the corresponding stretches 32', 33'. Also, preferably the last turn 32 is located in the damping groove of the frame, as shown in FIG. 8, to bring about a better transfer of the transverse waves into the boundary.

Due to identical considerations, in order not to increase unduly the electric resistance, the conductor strip is made wider at the connections at the ends of each straight stretch.

As shown in FIGURES 8, 9, and 10 a plastic thin membrane 81 is held in a taut position between frame members 82 and 83, the membrane being provided with a winding flat aluminum ribbon, flatly disposed on its surface, similar to the configuration shown in FIG. 3. The turn closest to the boundary of the frame extends beyond the oscillatable part of the membrane, its outer boundary being indicated by the dashed line 83'. The limit of the oscillatable part of the membrane is indicated by line 84, the depth of the damping groove by line 85. In FIGS. 9 and 10 the shapes of grooves giving satisfactory damping are shown, the width of the open ends of the grooves being shown on an enlarged scale.

We have found that membranes provided with a plurality of parallel stretches of aluminum ribbon of about 5 to 10 microns thickness and of a width of about 0.5 to 1.0 mm., provided with spacings of about 0.1 to 0.2 mm. between adjacent stretches of conductor ribbon, will result in a satisfactory electric impedance for use as speakers with conventional circuits.

For use as microphones, where a relatively high electric impedance is required, membranes having an imprinted circuit of aluminum ribbon of about 0.2 mm. width and spacings of about 0.1 mm., provided on both sides of the membrane, will give the desired result. Preferably an arrangement is resorted to where the ribbon is provided in such way on both sides of the membrane, that the free intervals of each side are covered by ribbon located on the other side.

It is to be understood that most advantageous results are obtained with use of the damping means in combination with a membrane circuit arranged in a plurality of parallel stretches, so as to provide the necessary electric impedance.

The damping channels 71 shown in FIG. 7, may be used with any form of damping groove, including those of FIGS. 5, 6, 7, 9 and 10. While other sets of channels 71 are shown in FIG. 7, on each face of the groove, any convenient or desirable number may be used, suitable to accomplish the desired result of improved damping.

It will be understood that the conductor strips may be applied to the membrane in any suitable manner, such as by printing, plating, etching, laminating, adhesives, etc.

The foregoing description is intended to be merely illustrative of presently preferred embodiments of the invention, of which many variations will be readily apparent to those skilled in this art, the scope of the invention being defined solely by the appended claims.

What is claimed is:

1. An electro-acoustical transducer comprising, in combination, an oscillatable membrane having edges along its boundaries, a conductive strip carried flat on said membrane, a frame supporting the edges of said membrane, the frame boundaries facing said membrane being of a curved configuration, and magnet pole members substantially parallel to said membrane, said members having a plurality of unipolar zones with a transition zone between each pair of adjacent opposite-polarity unipolar zones, said conductive strip being located in at least one of said transition zones, said conductive strip having a plurality of parallel portions joined at their ends, said parallel portions being arranged in groups, with the parallel portions of each group being connected in series to have current flow therealong in the same direction.

2. An electro-acoustical transducer comprising, in combination, an oscillatable membrane having edges along its boundaries, a conductive strip carried flat on said membrane, a frame supporting the edges of said membrane, the sides of said membrane being rounded off at the place of meeting with adjacent sides, and magnet pole members substantially parallel to said membrane, said members having a plurality of unipolar zones with a transition zone between each pair of adjacent opposite-polarity unipolar zones, said conductive strip being located in at least one of said transition zones, said conductive strip having a plurality of parallel portions joined at their ends, said parallel portions being arranged in groups, with the parallel portions of each group being connected in series to have current flow there-along in the same direction, adjacent groups being interconnected in series to have current flow in opposite directions along their respective parallel portions and to form a nested arrangement of generally serpentine shapes.

3. An electro-acoustical transducer comprising, in combination, an oscillatable membrane having edges along its boundaries, a conductive strip carried flat on said membrane, a frame supporting the edges of said membrane, the sides of said membrane being rounded off at the place of meeting with adjacent sides, and magnet pole members substantially parallel to said membrane, said frame having two portions holding the edges of said membrane therebetween, and means formed in said frame to suppress transverse waves in said membrane.

4. An electro-acoustical transducer comprising, in combination, an oscillatable membrane having edges along its boundaries, a plurality of conductive strips connected to each other and carried flat on said membrane so that current in each of said strips flows in the same direction, a curved frame supporting the edges of said membrane, and magnet pole members substantially parallel to said membrane, and means formed in said frame to suppress transverse waves in said membrane, said means comprising a groove extending around the inner edge of said frame, and channel means formed in the faces of said groove.

5. An electro-acoustical transducer comprising, in combination, an oscillatable membrane having edges along its boundaries, a plurality of conductive strips connected to each other and carried flat on said membrane so that current in each of said strips flows in the same direction, a curved frame supporting the edges of said membrane, and magnet pole members substantially parallel to said membrane, and means formed in said frame to suppress transverse waves in said membrane, said frame having a narrow groove extending around the inner edge thereof, said groove having generally parallel faces, slightly spaced from and on either side of said membrane.

6. An electro-acoustical transducer comprising, in combination, an oscillatable membrane having edges along its boundaries, a plurality of conductive strips connected to each other and carried flat on said membrane so that current in each of said strips flows in the same direction, a curved frame supporting the edges of said membrane, and magnet pole members substantially parallel to said membrane, and means formed in said frame to suppress transverse waves in said membrane, said frame having a narrow groove extending around the inner edge thereof, said groove having generally converging faces, with said membrane being held by said frame at substantially the point of convergence of said groove faces.

References Cited by the Examiner

UNITED STATES PATENTS

| 2,427,844 | 9/47 | Eklov | 179—180 |
| 2,535,757 | 12/50 | Root | 179—115.5 |
| 3,066,200 | 11/62 | Pavlak | 179—115.5 |

FOREIGN PATENTS

| 262,910 | 12/26 | Great Britain. |

OTHER REFERENCES

"Elements of Loudspeaker Practice," by N. W. McLachlan, Oxford University Press, 1935; pages 28–31.

"Microphones—How to Use Them," by Willard Moody, Radio News, 1943; pages 38 and 39.

ROBERT H. ROSE, *Primary Examiner.*

L. MILLER ANDRUS, *Examiner.*